March 24, 1959 W. J. SCAVUZZO ET AL 2,878,936
FILTER UNIT
Filed April 5, 1957

WILLIAM J. SCAVUZZO
FRANK ROMEO
*INVENTORS*

BY Lawrence J. Winter
ATTORNEY

United States Patent Office 2,878,936
Patented Mar. 24, 1959

2,878,936

FILTER UNIT

William J. Scavuzzo, Clark, and Frank Romeo, Newark, N.J., assignors to Purolator Products, Inc., Rahway, N.J., a corporation of Delaware Application April 5, 1957, Serial No. 650,888

7 Claims. (Cl. 210—90)

The present invention relates to a filter unit, and more particularly to a filter unit used in connection with hydraulic operating fluids.

In a filter system using a hydraulic operating fluid, it is essential that the fluid be carefully filtered to the finest degree possible in order to avoid mechanical failures of the mechanism the fluid serves by reason of the presence of solid impurities. For example, in aircraft systems, such as aircraft landing gear systems, aircraft cowl flap systems, and other aero-dynamic systems, the passage of solid impurities through the system with the fluid may be of such critical nature as to cause failure of the aircraft operation due to the filter unit not performing its essential function. Hence, it is necessary that the filter unit be changed or cleaned before the critical period is reached which occurs when the filter unit either becomes clogged so that no fluid passes therethrough, or the unit permits solid impurities in the fluid to pass through the relief valve in the system.

An object of the present invention is to provide a filter unit having a signal means therein to enable the operator to know when the filter unit must be cleaned or replaced to maintain the finest degree of filtration possible, in order to avoid mechanical failures of the mechanism which the fluid serves.

Another object of the present invention is to provide a filter unit having a safety signal mechanism actuated by differential pressure to indicate when the filter element needs servicing.

A further object of the present invention is to provide a filter unit having an indicator mechanism thereon which signals when the filter element needs servicing and remains in such position until reset manually after the element is serviced.

Another object of the present invention is to provide a mechanical signal device for directly indicating the need to service a filter element without requiring additional electrical equipment responsive to indirect signal means.

A still further object of the present invention is to provide a signal device installed in a filter assembly having no by-pass filter means therein which signals when the filter element needs to be serviced and permits no flow therethrough of unfiltered fluid.

Figure 1:
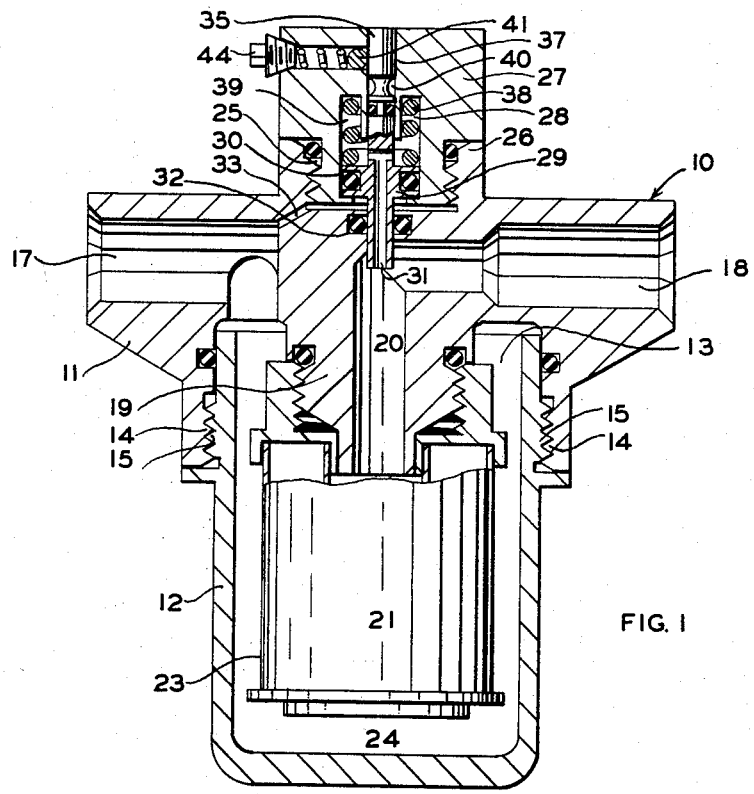
Figure 2:
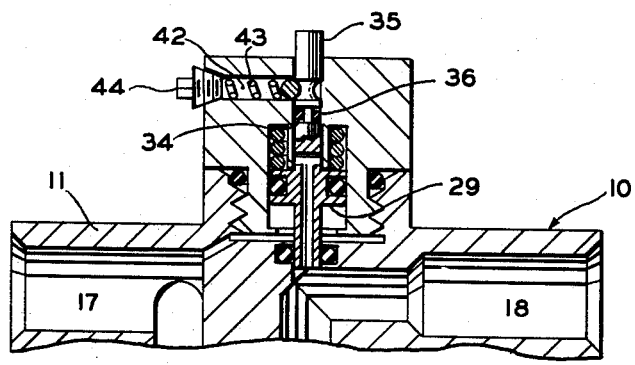

The invention will be better understood from the following description when considered in connection with the accompanying drawings forming a part thereof and in which:

Fig. 1 is a vertical sectional view of the filter unit embodying the present invention indicating the position of the signal device when the filter unit is clean and operating under normal conditions, and Fig. 2 is a fragmentary view similar to Fig. 1 showing the filter unit of the present invention with the signal device indicating that the filter element therein requires servicing.

Referring to the drawings, the reference numeral 10 generally designates an oil filter assembly comprising a hollow body or head 11 and a main body member or casing 12.

Head 11 has a bore 13 in the lower portion thereof, threaded at 14 to receive the threads 15 on casing 12. The upper portion of head 11 has horizontal inlet and outlet passages or ports 17 and 18 respectively, drilled therein through which high pressure oil to be filtered is passed. A center tube, or tubular member 19 is formed integral with the head and extends downwardly therefrom axially of bore 13. Center tube 19 is concentrically disposed within the bore so that the bore is generally annular in shape. The bore 20 of center tube 19 communicates with outlet port 18.

A filter element 21 is disposed in casing 12 threadably connected by its upper end cap 22 to center tube 19 so that the downstream side or interior of the filter element 21 communicates with bore 20 of the center tube while the upstream side or outer side 23 of the element communicates with inlet port 17 through inlet chamber 24 formed by casing 12.

A concentric counterbore or recess 25 is disposed in the threaded neck portion 26 of head 11. A cap member 27 is threaded into counterbore 25 to seat against the neck portion 26. Cap member 27 has an open end cylinder 28 formed therein in which is disposed a piston valve or member 29 for reciprocating movement.

Piston 29 has an annular recess in which is inserted an O-ring seal 30 for preventing the leakage of oil around the piston. The piston is provided with a hollow piston rod 31 having one end thereof extending through a passage 32 drilled in head 11 and into bore 20 of the center tube 19. The other end of the piston rod extends beyond the upper side of piston 29 in the cylinder to permit communication of the upper end of cylinder 28 with the bore of center tube 19. A diagonal passage 33 is drilled in head 11 between inlet port 17 and recess 25 to permit communication of incoming oil passing into the filter unit with the underside of piston 29 and the lower end of cylinder 28.

The upper end of piston rod 31 is provided with an indicator rod 35 formed integral therewith. Rod 35 is disposed in a bore 37 drilled through cap 27 in communication with cylinder 28. An O-ring seal 36 is disposed in an annular recess 34 on the indicator rod to prevent leakage of oil from cylinder 28 out of the top of the cap member through bore 37.

A compression spring 38 is disposed in cylinder 28 adjacent the upper side of piston 29. The upper end of spring 38 is positioned in an annular slot 39 provided in the cap to maintain the piston seated against the lower end of cylinder 28 during normal operation of the filter assembly.

The indicator rod 35 has the portion thereof adapted to extend beyond the cap member coated red or some other vivid color. The lower portion of the indicator rod 35 is provided with a concave recess 40 adapted to receive a spring ball 41 disposed in a horizontal bore 42 drilled in the top of the cap member when the indicator is positioned in its uppermost position and projects outside of the cap member, as hereinafter described. Spring ball 41 is held in contact with the indicator rod by compression spring 43 disposed in bore 42 and held compressed therein by a plug 44 threaded into the bore.

In operation, when the filter unit of the present invention is clean and providing a fine degree of filtration, the indicator or warning device of the present invention is disposed within the cap member and piston 29 is positioned in its lowermost position in cylinder 28, as shown in Fig. 1. At this time the incoming oil to be filtered flows through inlet port 17 and chamber 24 into filter element 21. The filter element prevents the solid particles from passing therethrough and the clean oil flows through center tube 19 and passes out of the filter unit through outlet port 18. A portion of the clean oil flows through hollow piston rod 31 into the upper end of cylinder 28 while another portion of the dirty oil flows through bore 31 into recess 25 and the lower end of cylinder 28. During normal operation when the filter is clean the pressure of the oil in the lower end of the cylinder acting upon the underside of piston 29 is equal to the pressure of oil in the upper end of cylinder 28 acting on the top of the piston so that the force in spring 38 maintains the piston in the bottom portion of the cylinder.

When the inlet side 23 of filter element 21 becomes clogged with contaminants which have been removed from oil passing through the filter element it causes the oil pressure to build up and increase on the upstream side of the filter unit while the pressure on the downstream side of the element either remains the same or decreases so as to cause an increase in the pressure differential normally maintained between the opposite sides of the filter element. This increase in pressure differential is transmitted to the upper and lower ends of cylinder 28 through piston rod 31 and passage 33 so that when the pressure differential increases above a predetermined value sufficient to overcome the force in spring 38 maintaining piston 29 in the lower end of the cylinder, the piston will move upwardly therein. The upward movement of the piston causes the indicator rod 35 to move above the cap member to project therefrom thus signalling or indicating the filter element needs servicing.

The provision of the sealing ring 30 in piston 29 prevents leakage of oil around the piston while permitting substantial axial movement of the piston and indicator rod 35 to signal the need for servicing the filter. Thus, the present invention provides a direct mechanical signalling device which requires no additional equipment to indicate such need, as is necessary where apparatus having virtually no movement actuates a sensitive electrical circuit.

When the concave groove 40 moves adjacent spring ball 41, the spring ball engages the groove in the piston shaft and prevents the piston from returning to its normal position until released manually. After servicing, the indicator rod is pushed back down to its original position and the filter unit will be able to repeat its original operation until it again needs servicing.

Inasmuch as changes may be made in the form, location and relative arrangement of the several parts without departing from the essential characteristics of the invention, it will be understood that the invention is not to be limited except by the scope of the appended claims.

What is claimed is:

1. A filter unit comprising a housing formed by a casing and a head having an inlet and outlet therein for flowing fluid to be filtered therethrough, a filter element disposed in said casing for filtering fluid flowed therethrough, a cylinder in said head, a piston disposed for reciprocating movement in said cylinder, fluid passage means in communication with said inlet and said cylinder adjacent one side of said piston, other fluid passage means in communication with said outlet and said cylinder adjacent the opposite side of said piston, biasing means for normally maintaining said piston adjacent one end of said cylinder, a signal device in said head having a service setting position for indicating the need for servicing said element, said piston being operatively connected to said device and operable in response to changes in differential pressure between said inlet and outlet for moving said device to its service setting position when said differential pressure increases above a predetermined value.

2. A filter unit comprising a housing having an inlet and outlet therein for flowing fluid to be filtered therethrough, a filter element disposed in said housing for filtering fluid flowed therethrough, a cylinder in said housing, a piston disposed for reciprocating movement in said cylinder, fluid passage means in communication with said inlet and said cylinder adjacent one side of said piston, other fluid passage means in communication with said outlet and said cylinder adjacent the opposite side of said piston, biasing means for normally maintaining said piston adjacent one end of said cylinder, an indicator rod in said housing operatively connected to said piston and adapted to be moved outside the housing when said element needs servicing, said piston being responsive to changes in differential pressure between said inlet and outlet for moving said rod to its service position when said differential pressure increases above a predetermined value.

3. A filter unit of claim 2 wherein said indicator rod has a notch thereon and locking means are provided extending into said notch to lock the rod in its service position until released by hand.

4. A filter unit comprising a housing having an inlet and outlet therein for flowing fluid to be filtered therethrough, a filter element disposed in said housing for filtering fluid flowed therethrough, a signal device in said housing having a service setting position for indicating the need for servicing said element, a cylinder in said housing, a piston disposed for reciprocating movement in said cylinder, fluid passage means in communication with said inlet and said cylinder adjacent one side of said piston, other fluid passage means in communication with said outlet and said cylinder adjacent the opposite side of said piston, biasing means for normally maintaining said piston adjacent one end of said cylinder, said piston being operatively connected to said device and operable in response to changes in differential pressure between said inlet and outlet for moving said device to its service setting position when said differential pressure increases above a predetermined value.

5. A filter unit comprising a housing having an inlet and outlet therein for flowing fluid to be filtered therethrough, a filter element disposed in said housing for filtering fluid flowed therethrough, said housing having a recess therein, a cap member threaded into said recess, a cylinder in said cap member, a piston disposed in said cylinder having a hollow piston rod formed integral therewith in communication with said outlet at one end thereof and with said cylinder adjacent one side of said piston at the opposite end thereof, fluid passage means in communication with said inlet at one end thereof and with said cylinder adjacent the opposite side of said piston at the other end thereof, biasing means normally urging said piston adjacent one end of the cylinder, said cap member having a drilled bore therein, an indicator rod for signalling the need to service said element disposed in said bore and formed integral with said piston rod, said piston being operable in response to changes in the differential pressure between said inlet and outlet for moving said piston toward the opposite end of said cylinder until said indicator rod extends beyond said bore when said differential pressure increases above a predetermined value.

6. The filter unit of claim 5 wherein said rod has a notch therein and locking means are provided to extend into said notch to hold the rod in its service position.

7. A filter unit comprising a housing having an inlet and outlet therein for flowing fluid to be filtered therethrough, a filter element disposed in said housing for filtering fluid flowed therethrough, said housing having a recess therein, a cap member threaded into said recess, a cylinder in said cap member, a piston disposed in said cylinder having a hollow piston rod formed integral therewith in communication with said outlet at one end thereof and with said cylinder adjacent one side of said piston at the opposite end thereof, fluid passage means in communication with said inlet at one end thereof, and with said cylinder adjacent the opposite side of said piston at the other end thereof, biasing means normally urging said piston adjacent one end of the cylinder, said cap member having a drilled vertical bore therein, and indicator rod for signalling the need to service said element disposed in said vertical bore and formed integral with said piston rod, said rod having an annular groove therein, said cap member having a horizontal bore therein communicating with said vertical bore, a ball member in said horizontal bore adapted to seat in said groove, spring means adapted to maintain said ball member in contact with said indicator rod, said piston being operable in response to changes in the differential pressure between said inlet and outlet for moving said piston toward the opposite end of said cylinder until said indicator rod extends beyond said vertical bore and said ball seats in said groove when said differential pressure increases above a predetermined value.

References Cited in the file of this patent
UNITED STATES PATENTS

| | | |
|---|---|---|
| 2,400,200 | Katcher | May 14, 1946 |
| 2,669,707 | Ehrman | Feb. 16, 1954 |
| 2,729,339 | McCoy | Jan. 3, 1956 |